United States Patent

Kamijo

[11] Patent Number: 4,489,804
[45] Date of Patent: Dec. 25, 1984

[54] STRAP RETRACTOR ASSEMBLY

[75] Inventor: Ken Kamijo, Zushi, Japan

[73] Assignee: Nissan Motor Company, Limited, Yokohama, Japan

[21] Appl. No.: 457,129

[22] Filed: Jan. 11, 1983

[30] Foreign Application Priority Data

Feb. 23, 1982 [JP] Japan .................. 57-27597

[51] Int. Cl.³ ........................................... B60R 21/10
[52] U.S. Cl. ..................... 180/268; 242/107; 280/801; 280/807; 297/476
[58] Field of Search ............... 180/268, 269; 280/801, 280/802, 807; 242/107; 297/476, 477

[56] References Cited

U.S. PATENT DOCUMENTS

| 3,767,134 | 10/1973 | Morales | 180/268 |
| 3,771,742 | 11/1973 | Okuda | 242/107.4 R |
| 3,913,860 | 10/1975 | Takoda | 200/61.58 B |
| 3,986,093 | 10/1976 | Wakamatsu et al. | 280/802 |
| 3,987,864 | 10/1976 | Lijima et al. | 180/269 |
| 4,344,502 | 8/1982 | Terabayashi | 280/802 |
| 4,346,778 | 8/1982 | Blüggez et al. | 180/268 |
| 4,387,862 | 6/1983 | Sakurada et al. | 280/807 X |

Primary Examiner—Joseph F. Peters, Jr.
Assistant Examiner—Kenneth R. Rice
Attorney, Agent, or Firm—Lane, Aitken & Kananen

[57] ABSTRACT

A strap retractor assembly of a seat belt arrangement including a retaining strap to be fitted to an occupant of a seat in a vehicle, comprising a reel shaft having the retaining strap anchored thereto; a drive motor for driving the reel shaft for rotation in direction to have the retaining strap unwound from and re-wound on the reel shaft; pulse generators to produce first pulses in response to rotation of the reel shaft in one direction and second pulses in response to rotation of the reel shaft in the other direction; a pulse counter to count the first pulses forwardly and the second pulses backwardly for producing an information signal representative of the number of the pulses counted; a reference signal generator to produce a reference signal variable with a preselected parameter and representative of a number of pulses corresponding to a desired degree of slackness of the strap; comparators to produce a signal when the number of the pulses represented by the information signal is in a predetermined relationship to the number of pulses represented by the reference signal; and a signal processing network to process the signals and pulses delivered from the pulse generators and comparators and to produce, on the basis of the signal from the comparators, a signal to actuate the motor into operation driving the reel shaft in either direction.

6 Claims, 6 Drawing Figures

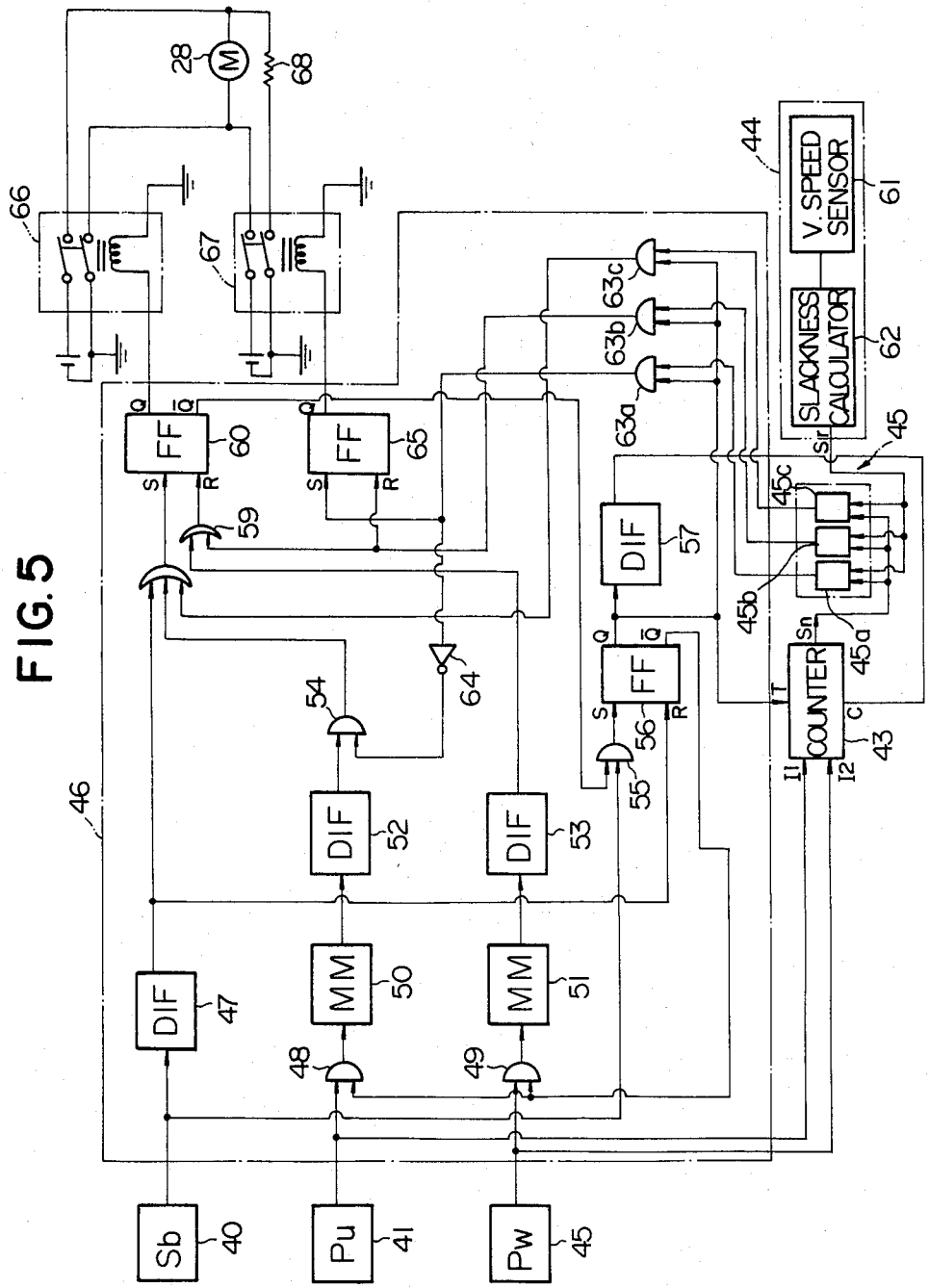

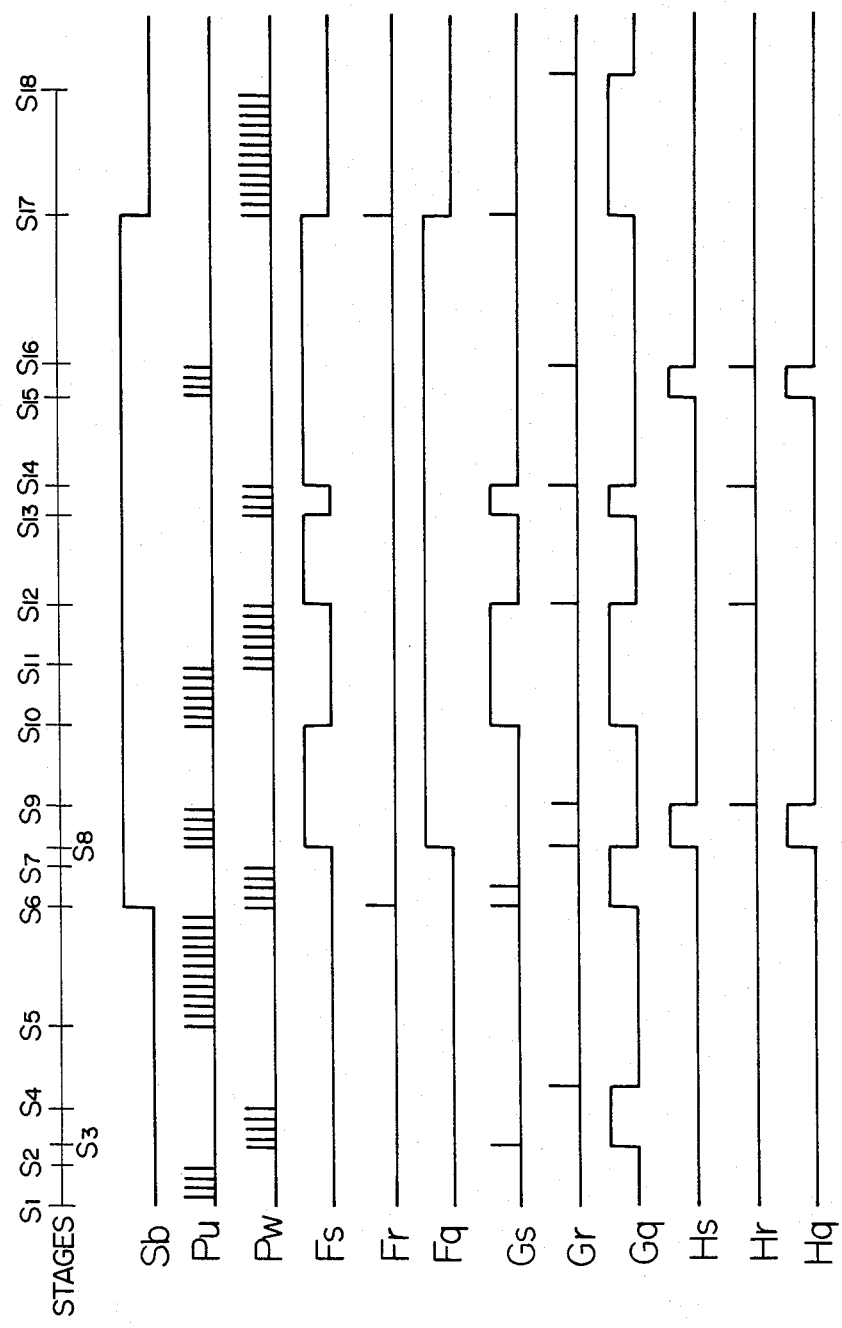

4,489,804

STRAP RETRACTOR ASSEMBLY

FIELD OF THE INVENTION

The present invention relates to a strap retractor assembly for use in a vehicular seat belt arrangement and more particularly to a strap retractor assembly of the type which includes a drive motor to have a retaining strap wound on or unwound from a reel shaft of the retractor assembly.

SUMMARY OF THE INVENTION

In accordance with the present invention, there is provided a strap retractor assembly for use in a vehicular seat belt arrangement including an elongated flexible retaining strap to be fitted to an occupant of a seat structure in a vehicle body, comprising a reel shaft rotatable about an axis fixed with respect to the vehicle body and having the retaining strap anchored thereto at one end of the strap; a drive motor operable for driving the reel shaft for rotation about the aforesaid axis in a direction to have the retaining strap unwound from the reel shaft and in a direction to have the retaining strap re-wound on the reel shaft; a combination of gears mechanically intervening between the reel shaft and the drive motor for transmitting a driving power from the drive motor to the reel shaft; pulse generating means operative to produce first pulses in response to rotation of the reel shaft in one direction about the aforesaid axis and second pulses in response to rotation of the reel shaft in the other direction about the aforesaid axis; resettable pulse counting means operative to count the first pulses forwardly and the second pulses backwardly and to produce an information signal representative of the number of the pulses counted; reference signal generating means responsive to a variable parameter and operative to produce a reference signal which is variable with the parameter and which is representative of a number of pulses corresponding to a desired degree of slackness of the retaining strap; comparing means operative to compare the number of the pulses represented by the information signal with the number of pulses represented by the reference signal and to produce a signal when the number of the pulses represented by the information signal is in a predetermined relationship to the number of pulses represented by the reference signal; and a signal processing network operative to process the signals and pulses delivered from the tongue-buckle switch, first and second pulse generators and comparing means and to produce, on the basis of the output signal from the comparing means, a control signal to actuate the drive motor into operation driving the reel shaft in either direction about the center axis thereof.

BRIEF DESCRIPTION OF THE DRAWINGS

The features and advantages of a strap retractor assembly according to the present invention will be more clearly appreciated from the following description taken in conjunction with the accompanying drawings in which:

FIG. 5 is a diagram showing the circuit arrangement of a control circuit forming part of the retractor assembly embodying the present invention; and FIG. 6 is a view showing examples of the waveforms of signals and pulses to appear in the control circuit shown in FIG. 5.

DESCRIPTION OF THE PRIOR ART

Figure 1:
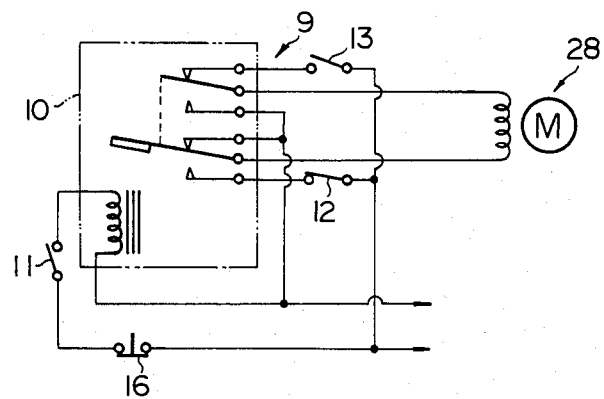
FIG. 1 is a diagram showing the electrical arrangement of the control circuit of a prior-art strap retractor assembly.
Figure 2:
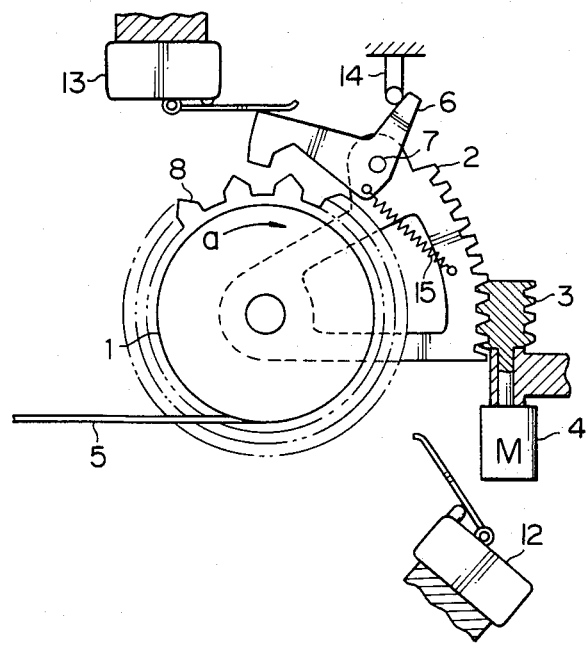
FIG. 2 is a side elevation view showing, partly in section, the mechanical arrangement of the prior-art strap retractor assembly.

An example of a strap retractor assembly using a drive motor is shown in FIGS. 1 and 2. The strap retractor assembly herein shown is taught in Japanese Patent Publication No. 52-9891 and comprises a reel drum 1 and a sector gear 2 which is rotatable independently of the reel drum 1. The sector gear 2 engages with a worm gear 3 carried on the output shaft of a drive motor 4. A flexible retainer strap 5 to be fitted to an occupant of a seat is wound on the reel drum 1. The sector gear 2 has mounted thereon a pawl member 6 which is rockable about a pivot shaft 7 secured to the sector gear 2 and which is engageable with a ratchet wheel 8 rotatable with the reel drum 1. The drive motor 4 is connected to a power source (not shown) across a switch circuit 9 including a relay 10, a tongue-buckle switch 11 and two limit switches 12 and 13 each of which is of the normally-closed type. The tongue-buckle switch 11 is adapted to close when the tongue or male member secured to the retainer strap 5 is fitted to the buckle or female member attached to an auxiliary retainer strap though not shown in the drawings. When the retainer strap 5 wound on the reel drum 1 is pulled and unwound from the reel drum 1 and thereafter the tongue member is fitted to the buckle by the occupant of the seat, the switch 11 is caused to close and permits the drive motor 4 to be energized from the power source through one pair of stationary contacts of the relay 10 and the limit switch 12. The worm gear 3 is driven for rotation by the motor 4 thus actuated and drives the sector gear 2 for rotation with respect to the reel drum 1 in a direction to slacken the retainer strap 5 as indicated by arrow a in FIG. 2. As the sector gear 2 is caused to turn, the pawl member 6 is disengaged from the actuator element of the other limit switch 13, which is as a consequence permitted to close. As the sector gear 2 is further turned in the direction of the arrow a, the pawl member 6 is disengaged from a stationary stop 14 and is caused to turn on the sector gear 2 into engagement with the ratchet wheel 8 by the force of a spring 15. The reel drum 1 is now permitted to rotate with the sector gear 2 in the direction of the arrow a and as a consequence the retainer strap 5 is paid from the reel drum 1. When the retainer strap 5 is paid a predetermined length from the reel drum 1, the sector gear 2 is brought into engagement with the actuator element of the limit switch 12. This causes the limit switch 12 to open and disconnect the drive motor 4 from the power source so that the reel drum 1 is brought to a stop and is thereafter held in position by means of the sector gear 2, worm gear 3, pawl member 6 and ratchet wheel 8.

When the tongue-buckle switch 11 becomes open with the tongue member released from the buckle, the drive motor 4 is energized through the limit switch 13 and the other pair of stationary contacts of the relay 10. The sector gear 2 and the reel drum 1 are driven for rotation in a direction opposite to the direction of the arrow a. When the sector gear 2 is turned into the initial angular position thereof, the pawl member 6 is brought into engagement with the stop 14 and is disengaged from the ratchet wheel 8. The reel drum 1 is now driven for rotation in a direction to have the retainer strap 5 wound thereon by a spring (not shown) which is incorporated in the reel drum 1.

One of the drawbacks of a prior-art strap retractor assembly of the above described type is that the retainer strap 5 is wound on the reel drum 1 by means of the spring incorporated in the reel drum 1 per se. Provision of the spring within the reel drum 1 adds to the size and intricacy of the construction of the retractor assembly as a whole. Another drawback results from the fact that the degree of slackness of the retainer strap 5 is regulated by controlling the operation of the drive motor 4 by the tongue-buckle switch 11 and limit switches 12 and 13. If the retainer strap 5 is fitted to the seat occupant in a slackened state, the strap 5 would be excessively slackened when the strap 5 is paid from the drum 1 by actuation of the drive motor 4. The excessive slackness of the retainer strap 5 thus fitted to the seat occupant can be remedied by the use of a manually-operated switch 16 (FIG. 1) provided in scries with the tongue-buckle switch 11. Manipulation of such a switch 16 is, however, not only irksome but will require the user of the seat belt arrangement to be constantly alert. The present invention contemplates provision of an improved strap retractor assembly eliminating all these drawbacks of a prior-art strap retractor assembly for a vehicular seat belt arrangement.

DESCRIPTION OF THE PREFERRED EMBODIMENT

Figure 3:
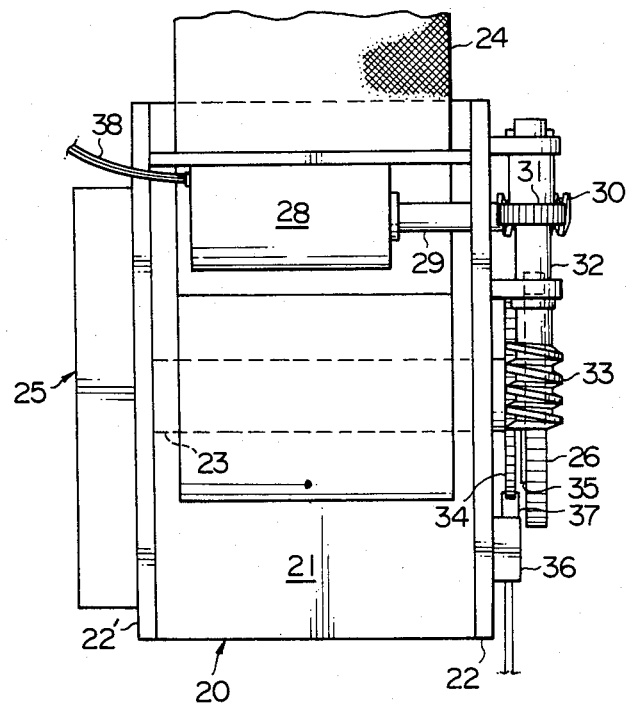
FIG. 3 is a sectional view showing the mechanical construction of a strap retractor assembly embodying the present invention.
Figure 4:
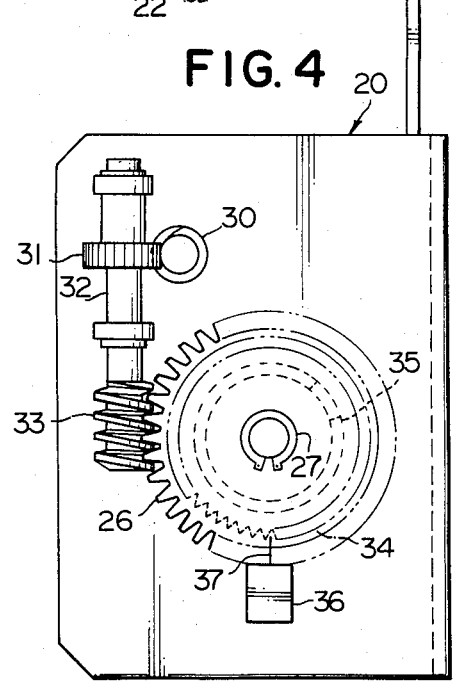
FIG. 4 is a side elevation view of the retractor assembly shown in FIG. 3.

Referring to FIGS. 3 and 4, a retractor assembly embodying the present invention comprises a casing 20 having a generally U-shaped cross section and thus consisting of a base wall 21 and a pair of side walls 22 and 22' projecting perpendicularly from the opposite side ends of the base wall 21. A reel shaft 23 is rotatably supported on these side walls 22 and 22'. An elongated, flexible retaining strap 24 is anchored at one end thereof to the reel shaft 23 in a suitable manner and is wound in layers on the reel shaft 23 when the reel shaft 23 is driven for rotation in one direction about the center axis thereof. The reel shaft 23 is connected at one end thereof to a deceleration-sensitive emergency locking unit 25 using, for example, a mass member (not shown) and adapted to lock the reel shaft 23 in response to a sudden deceleration of the vehicle. The construction and arrangement of such an emergency locking unit 25 is well known in the art and, for this reason, will not be herein described and shown.

Though not shown in the drawings, the casing 20 is securely attached to the vehicle body or to a seat structure installed on the floor panel of the vehicle body. The retaining strap 24 endwise extends from the retractor assembly obliquely over the seat structure and is passed through a tongue or male member to be releasably fitted to a buckle or female member fastened to an auxiliary retraining strap. The retaining strap 24 passed through the tongue member is anchored at its leading end to the vehicle body.

The reel shaft 23 has carried on the other end portion thereof a first worm wheel 26 which is coaxially rotatable on the reel shaft 23 and which is axially held in position on the reel shaft 23 by means of a snap ring 27 fitted to the end portion of the shaft 23 as shown in FIG. 4. A drive motor 28 is mounted on the base wall 21 of the casing 20 and has an output shaft 29 projecting outwardly through an opening in the side wall 22 of the casing 20. The motor output shaft 29 extends in parallel with the reel shaft 23 and has fixedly carried thereon a first worm 30 which is held in mesh with a second worm wheel 31. The second worm wheel 31 is fixedly mounted on a worm shaft 32 rotatably mounted on the side wall 22 of the casing 20 and having a center axis perpendicular in non-intersecting relationship to the axis of rotation of the worm 30. The worm shaft 32 has fixedly carried thereon a second worm 33 held in mesh with the first worm wheel 26.

The reel shaft 23 has further carried thereon a ratchet wheel 34 which is also coaxially rotatable on the reel shaft 23. Between the worm wheel 26 and the ratchet wheel 34 is provided a friction interlocking spring 35 engaging both of the wheels 26 and 34. The friction interlocking spring 35 is adapted to transmit rotation of the first worm wheel 26 to the reel shaft 23 through the ratchet wheel 34 when the worm wheel 26 is driven from the drive motor 28 through the first worm 30, second worm wheel 31 and second worm 33. When the retaining strap 24 is manually pulled and unwound from the reel shaft 23 by an occupant of the seat structure with the drive motor 28 held at rest, the friction interlocking spring 35 is caused to slide between the worm wheel 26 and the ratchet wheel 34 so that the reel shaft 23 is permitted to rotate about the center axis thereof with respect to the worm wheel 26. When, on the other hand, the drive motor 28 is operating with the retaining strap 24 completely re-wound on the reel shaft 23 or tightly fitted to the seat occupant, the friction interlocking spring 35 is also caused to slide between the worm and ratchet wheels 26 and 34 so that the rotation of the worm wheel 26 is not transmitted to the reel shaft 23 and accordingly the reel shaft 23 is permitted to remain at rest. The ratchet wheel 34 forms part of pulse generating means which further comprises a pulse generating switch unit 36 mounted on the side wall 22 of the casing 20 and including an electrically conductive, elastic detector element 37 constantly engaged by the teeth of the ratchet wheel 34 and rockable about an axis fixed with respect to the casing 20. When the ratchet wheel 34 is driven for rotation with the reel shaft 23 about the center axis of the reel shaft 23, the detector element 37 is caused to rock about such an axis as the teeth of the ratchet wheel 34 are successively brought into pressing engagement with the detector element 37. Though not shown in FIGS. 3 and 4, the pulse generating switch unit 36 further includes first and second pulse forming means responsive to the rocking motions of the detector element 37 and adapted to produce trains of logic "1" pulses Pu and Pw, respectively, depending upon the direction of rotation of the ratchet wheel 26. When the reel shaft 23 is driven for rotation about the center axis of the shaft 23 in a direction in which the retaining strap 24 is to be unwound therefrom, the detector element 37 is forced to warp in one direction so that the first pulse forming means of the switch unit 36 is operative to produce the train of logic "1" pulses Pu in a number equal to the number of the teeth of the ratchet wheel 34 which are brought into engagement with the detector element 37. When, on the other hand, the reel shaft 23 is driven for rotation in a direction in which the retaining strap 24 is to be re-wound thereon, the detector element 37 is forced to warp in the opposite direction so that the second pulse forming means of the switch unit 36 is operative to produce the train of logic "1" pulses Pw in a number equal to the number of the teeth of the ratchet wheel 34 brought into engagement with the detector element 37. The pulses Pu or Pw thus produced by the pulse generating switch unit 36 are supplied through lines 38 to a control circuit adapted to energize the drive motor 28 basically on the basis of the pulses produced by the pulse generating switch unit 36.

Turning to FIG. 5, such a control circuit comprises signal generating switch means responsive to a predetermined condition in which the retaining strap 24 is ready to be fitted to the seat occupant and pulse generating means operative to produce first pulses as the above mentioned pulses Pu in response to rotation of the reel shaft 23 (FIG. 3) in one direction about the center axis thereof and second pulses as the above mentioned pulses Pw in response to rotation of the reel shaft in the other direction about the axis. In the arrangement shown in FIG. 5, the signal generating switch means is constituted by a tongue-buckle switch 40 and the pulse generating means comprises first and second pulse generators 41 and 42 which are constituted by the above mentioned first and second pulse forming means, respectively, of the pulse generating switch unit 36. The tongue-buckle switch 40 is adapted to close when the tongue member having the retaining strap 24 passed therethrough is fitted to the buckle fastened to the auxiliary retaining strap. When the tongue-buckle switch 40 is closed, a signal Sb of a high level appears at the output terminal thereof as indicated in FIG. 6.

The control circuit shown in FIG. 5 further comprises resettable pulse counting means operative to count the pulses Pu from the first pulse generator 41 forwardly and the pulses Pw from the second pulse generator 42 backwardly and to produce an information signal Sn representative of the number N of the pulses counted. In the arrangement shown in FIG. 5, such pulse counting means is constituted by a forward-backward pulse counter 43. The control circuit further comprises reference signal generating means and comparing means. The reference signal generating means is responsive to a preselected variable parameter and is operative to produce, on the basis of the detected value of the variable parameter, a reference signal Sr representative of a desired degree of slackness of the retaining strap 24 to be fitted to the seat occupant. The desired degree of slackness thus represented by the reference signal Sr is calculated in such a manner as to correspond to a variable number Nr of pulses similar to the pulses Pu and Pw from the first and second pulse generators 41 and 42. The comparing means is operative to compare the number N of the pulses Pu and/or Pw represented by the information signal Sn with the variable number Nr of pulses represented by the reference signal Sr and to produce an output signal when the number N is in a predetermined relationship to the number Nr. In the arrangement of FIG. 5, the reference signal generating means is constituted by a reference signal generator 44 and the comparing means is constituted by a comparator network 45.

The control circuit further comprises a signal processing network 46 adapted to process the signals and pulses delivered from the above mentioned tongue-buckle switch 40, first and second pulse generators 41 and 42 and comparator network 45 and to produce, on the basis of the output signal from the comparator network 45, a control signal to actuate the drive motor 28 into operation driving the reel shaft 23 in either direction about the center axis thereof. In the arrangement shown in FIG. 5, such a network 46 comprises a differentiator 47 having an input terminal connected to the tongue-buckle switch 40 and adapted to detect rising and falling voltages of a signal Sb produced at the input terminal of the differentiator 47 when the tongue-buckle switch 40 is closed and to produce a logic "1" pulse in response to a rise or a fall of a voltage at the input terminal thereof. The signal processing network 46 further comprises a first two-input logic "AND" gate circuit 48 having one of its input terminals connected to the first pulse generator 41 and a second two-input logic "AND" gate circuit 49 having one of its input terminals connected to the second pulse generator 42. The first and second logic "AND" gate circuits 48 and 49 have their output terminals connected to first and second monostable multivibrators 50 and 51, respectively, which in turn have their output terminals connected to second and third differentiators 52 and 53, respectively. These differentiators 52 and 53 are adapted to detect the falling edges of the logic "1" pulses to be delivered from the first and second monostable multivibrators 50 and 51, respectively. The second differentiator 52 has its output terminal connected to one input terminal of a third two-input logic "AND" gate circuit 54. The tongue-buckle switch 40 is connected not only to the differentiator 47 as described above but to one of the input terminals of a fourth two-input logic "AND" gate circuit 55 which has its output terminal connected to the set terminal S of a first flip-flop circuit 56 of the set-reset type. The reset terminal R of the flip-flop circuit 56 is connected to the output terminal of the first differentiator 47. The first flip-flop circuit 56 has a non-inverted output terminal Q connected to a fourth differentiator 57 responsive to rising and falling edges of a pulse to appear at the input terminal thereof and an inverted output terminal $\overline{Q}$ connected to the other input terminal of the first and second logic "AND" gate circuit 48 and 49. The output terminal of the first differentiator 47 is connected not only to the reset terminal of the first flip-flop circuit 56 but also to one input terminal of a three-input first logic "OR" gate circuit 58 which has another input terminal connected to the output terminal of the third logic "AND" gate circuit 54. The above mentioned third differentiator 53 has its output terminal connected to one input terminal of a two-input second logic "OR" gate circuit 59. The first and second logic "OR" gate circuits 58 and 59 have their output terminals connected to the set and reset terminals S and R, respectively, of a second flip-flop circuit 60. The second flip-flop circuit 60 has an inverted output terminal $\overline{Q}$ connected to the other input terminal of the fourth logic "AND" gate circuit 55 as shown.

The forward-backward pulse counter 43 has first and second input terminals $I_1$ and $I_2$ connected to the first and second pulse generators 41 and 42, respectively, a trigger terminal T connected to the non-inverted output terminal Q of the first flip-flop circuit 56 and a clear terminal C connected to the output terminal of the fourth differentiator 57. The pulse counter 43 is thus adapted to count the logic "1" pulses Pu or Pw appearing at the first or second input terminal $I_1$ or $I_2$, respectively, and to produce at its output terminal an information signal Sn representative of the number N of the logic "1" pulses counted. The information signal Sn is fed to the comparator network 45. The comparator network 45 comprises a parallel combination of at least three comparators which consist of first, second and third comparators 45a, 45b and 45c. The first, second and third comparators 45a, 45b and 45c have respective information signal input terminals connected in parallel to the output terminal of the pulse counter 43 and respective reference signal input terminals connected in parallel to the output terminal of the reference signal generator 44. The reference signal generator 44 is composed of a series combination of a vehicle speed sensor 61 and a slackness calculator 62. The vehicle speed sensor 61 is responsive to vehicle speed and operative to produce an output signal representative of the detected vehicle speed. The slackness calculator 62 is adapted to determine a desired degree of slackness of the retaining strap 24 on the basis of the vehicle speed represented by the output signal from the sensor 61 and to produce an output signal Sr representative of the degree of slackness thus determined. In the arrangement herein shown, the desired degree of slackness of the retaining strap 24 is assumed as corresponding to a number Nr of pulses similar to the logic "1" pulses Pu and Pw to be registered in the pulse counter 43 and as stepwise decreasing as the detected vehicle speed increases. Each of the comparators 45a, 45b and 45c is adapted to compare the information signal Sn from the counter 43 with the reference signal Sr from the reference signal generator 44 and to produce a logic "1" pulse from the first comparator 45a when the former is lower than the latter, from the second comparator 45b when the former is equal to the latter, and from the third comparator 45c when the former is higher than the latter.

The first, second and third comparators 45a, 45b and 45c of the comparator network 45 have their output terminals connected to one input terminals of fifth, sixth and seventh two-input logic "AND" gate circuits 63a, 63b and 63c, respectively. The other input terminals of the logic "AND" gate circuits 63a, 63b and 63c are jointly connected to the noninverted output terminal Q of the first flip-flop circuit 56. The fifth logic "AND" gate circuit 63a has its output terminal connected via a logic inverter 64 to the other input terminal of the third logic "AND" gate circuit 54 and to the set terminal S of a third flip-flop circuit 65. The sixth logic "AND" gate circuit 63b has its output terminal connected to the reset terminal R of the third flip-flop circuit 65 and to the other input terminal of the second logic "OR" gate circuit 59. The seventh logic "AND" gate circuit 63c has its output terminal connected to the remaining output terminal of the first logic "OR" gate circuit 58. The second and third flip-flop circuits 60 and 65 have their non-inverted output terminals Q connected to the coils of first and second relay switches 66 and 67 which are connected in parallel across the drive motor 28 as shown. In the arrangement shown in FIG. 6, it is assumed that the drive motor 28 is operative to drive its output shaft for rotation in a direction to have the retaining strap 24 re-wound on the reel shaft 23 when the first relay switch 66 is closed and that the drive motor 28 is operative to drive its output shaft for rotation in a direction to have the retaining strap 24 unwound from the reel shaft 23 respectively when the second relay switch 67 is closed. Between the second relay switch 67 and the drive motor 28 is provided a resistor 68 so that the motor 28 operates at a lower speed when the retaining strap 24 is to be unwound from the reel shaft 23 than when the retaining strap 24 is to be re-wound on the reel shaft 23.

Description will be hereinafter made regarding the operation of the retractor assembly embodying the present invention with reference to FIGS. 3 to 5 and further to FIG. 6. In FIG. 6, waveforms Fs, Fr and Fq are assumed to be those to appear on the set, reset and non-inverted output terminals S, R and Q, respectively, of the first flip-flop circuit 56, waveforms Gs, Gr and Gq are assumed to be those to appear on the set, reset and non-inverted output terminals S, R and Q, respectively, of the second flip-flop circuit 60, and waveforms Hs, Hr and Hq are assumed to be those to appear on the set, reset and non-inverted output terminals S, R and Q, respectively, of the third flip-flop circuit 65 in the signal processing network 46 shown in FIG. 5.

When, now, the retaining strap 24 of the seat belt arrangement is pulled away from the retractor assembly shown in FIGS. 3 and 4 so as to be fitted to the occupant of a seat structure as represented by phase $S_1-S_2$ in FIG. 6, the reel shaft 23 and accordingly the ratchet wheel 34 thereon are forced to turn about the center axis of the shaft 23. Under these conditions, the friction interlocking spring 35 slides on the ratchet wheel 34 so that the worm wheel 26 on the reel shaft 23 remains at rest with respect to the casing 20. The reel shaft 23 is thus driven to rotate about the center axis thereof against the frictional force produced between the ratchet wheel 34 and the friction interlocking spring 35. While the reel shaft 23 is being driven for rotation with the retaining strap 24 being unwound therefrom, the detector element 37 of the switch unit 36 is caused to slide on the teeth of the ratchet wheel 34 so that a train of logic "1" pulses Pu are produced by the first pulse generator 41 (FIG. 5) as indicated in FIG. 6. Under the conditions in which the retaining strap 24 is being fitted to the seat occupant, the tongue member of the seat belt arrangement is detached from the buckle so that the tongue-buckle switch 40 (FIG. 5) is held open. There is accordingly no logic "1" signal Sb at the output terminal of the tongue-buckle switch 40 as indicated in FIG. 6 and, as a consequence, logic "0" pulses are present at the output terminal of the first differentiator 47 and at the output terminal of the fourth logic "AND" gate circuit 55. In the presence of the logic "0" pulse at the set terminal S of the first flip-flop circuit 56, there is a logic "1" pulse appearing at the inverted output terminal $\overline{Q}$ of the first flip-flop circuit 56 and accordingly at one input terminal of the first logic "AND" gate circuit 48. The logic "1" pulses Pu supplied from the first pulse generator 41 to the other input terminal of the gate circuit 48 are therefore passed therethrough to the first monostable multivibrator 50. The first monostable multivibrator 50 is thus triggered to deliver to the second differentiator 52 a logic "1" pulse having a predetermined pulsewidth. When the retaining strap 24 is released from the pull under these conditions, the logic "1" output signal of the first monostable multivibrator 50 is shifted to a logic "0" signal, which causes the differentiator 52 to produce a logic "1" pulse in response to the falling edge of the logic "1" pulse which is thus disappeared from the input terminal thereof. The logic "1" pulse produced by the differentiator 52 is fed to one input terminal of the third logic "AND" gate circuit 54. In the presence of a logic "0" pulse at the non-inverted output terminal Q of the first flip-flop circuit 56 and accordingly at one input terminal of the fifth logic "AND" gate circuit 63a, the logic "AND" gate circuit 63a is maintained in a state producing a logic "0" pulse at the output terminal thereof. The logic "0" pulse thus appearing at the output terminal of the gate circuit 63a is converted into a logic "1" pulse by the logic inverter 64 so that the third logic "AND" gate circuit 54 is supplied with a logic "1" pulse at the other input terminal thereof. The logic "1" pulse delivered from the second differentiator 52 is therefore passed through the "AND" gate circuit 54 to one input terminal of the first logic "OR" gate circuit 58 and renders the "OR" gate circuit 58 into a state producing a logic "1" pulse. The logic "1" pulse appearing at the output terminal of the "OR" gate circuit 58 is supplied to the set terminal S of the second flip-flop circuit 60 and triggers the flip-flop circuit 60 to produce a logic "1" pulse at the non-inverted output terminal Q thereof as will be seen from the waveforms Gs and Gq in FIG. 6 as at stage $S_3$. The logic "1" pulse produced by the flip-flop circuit 60 causes the first relay switch 66 to close and actuates the drive motor 28 to start. The drive motor 28 is now put into operation driving the first worm 30 for rotation with the output shaft 29 of the motor 28. The rotation of the first worm 30 is transmitted through the second worm wheel 31 and the second worm 33 to the first worm wheel 26 and further through the friction interlocking spring 35 and the ratchet wheel 34 to the reel shaft 23. The drive motor 28 is therefore driven for rotation about the center axis thereof and causes the retaining strap 24 to be re-wound on the reel shaft 23.

The reel shaft 23 being driven for rotation in the direction to have the retaining strap 24 re-wound thereon, the first pulse generator 41 ceases delivery of the logic "1" pulses Pu and, in turn, the second pulse generator 42 is made operative to produce a train of logic "1" pulses Pw at the stage $S_3$. In the presence of the logic "1" pulse at the inverted output terminal $\overline{Q}$ of the flip-flop circuit 56 and accordingly at one input terminal of the second logic "AND" gate circuit 49, the pulses Pw delivered from the second pulse generator 42 are passed through the "AND" gate circuit 49 to the second monostable multivibrator 51. The second monostable multivibrator 51 is thus triggered to deliver to the second differentiator 53 a logic "1" pulse having a predetermined pulsewidth. When the retaining strap 24 is completely rewound on the reel shaft 23 under these conditions, the second pulse generator 42 ceases delivery of the pulses Pw as at stage $S_4$ (FIG. 6). At a certain point of time after the delivery of the pulses Pw has been ceased, the logic "1" pulse on the input terminal of the second monostable multivibrator 51 disappears and consequently a logic "0" pulse appears at the output terminal of the monostable multivibrator 51, causing the differentiator 53 to produce a logic "1" pulse in response to the falling edge of the logic "1" pulse which is thus disappeared from the input terminal thereof. The logic "1" pulse produced by the differentiator 53 is fed to one input terminal of the second logic "OR" gate circuit 59 and renders the "OR" gate circuit 59 into a state producing a logic "1" pulse. The logic "1" pulse appearing at the output terminal of the "OR" gate circuit 59 is supplied to the reset terminal R of the second flip-flop circuit 60 and clears the flip-flop circuit 60 as will be seen from the waveforms Gr and Gq in FIG. 6. A logic "0" pulse is now present at the non-inverted output terminal Q of the flip-flop circuit 60, making the first relay switch 66 open and thereby bringing the drive motor 28 to a stop. The drive motor 28 remains operative until the logic "1" pulse delivered from the second monostable multivibrator 51 appears after the retaining strap 24 has been completely re-wound on the reel shaft 23. Under these conditions, the first worm wheel 26 is freewheeling on the reel shaft 23 with the friction interlocking spring 35 sliding on the ratchet wheel 34.

Description will now be made on the assumption that the retaining strap 24 is unwound from the reel shaft 23 for a second time as at stage $S_5$–$S_6$ and thereafter the tongue member of the seat belt arrangement is fitted to the buckle as at stage $S_6$ (FIG. 6). The tongue member being fitted to the buckle, the tongue-buckle switch 40 is caused to close so that a signal Sb of a high level appears at the input terminal of the first differentiator 47 and one input terminal of the fourth logic "AND" gate circuit 55 at the stage $S_6$ as indicated in FIG. 6. In response to the rise in the voltage at the input terminal thereof, the differentiator 47 produces a logic "1" pulse and renders the first logic "OR" gate circuit 58 into the state producing a logic "1" pulse at the output terminal thereof. The logic "1" pulse thus produced by the "OR" gate circuit 58 is fed to the set terminal S of the second flip-flop circuit 60, which is accordingly caused to produce a logic "1" pulse at the non-inverted output terminal Q thereof. This in turn causes the first relay switch 66 to close and actuates the drive motor 28 to re-wind the retaining strap 24 on the reel shaft 23 (FIG. 3). The signal Sb of a high level appearing at the output terminal of the tongue-buckle switch 40 is also fed to one input terminal of the fourth logic "AND" gate circuit 55, which is however maintained in a state producing a logic "0" pulse at the output terminal thereof in the presence of a logic "0" pulse at the inverted output terminal $\overline{Q}$ of the flip-flop circuit 60. The logic "1" pulse produced at the output terminal of the first differentiator 47 is also supplied to the reset terminal R of the first flip-flop circuit 56 and clears the flip-flop circuit 56.

Until the drive motor 28 is thus actuated to have the retaining strap 24 re-wound on the reel shaft 23, viz., on phase $S_5$–$S_6$ shown in FIG. 6, the first pulse generator 41 is producing a train of logic "1" pulses Pu and causes the first monostable multivibrator 50 to deliver to the second differentiator 52 a logic "1" pulse with a predetermined pulsewidth. After the drive motor 28 is put into operation as described above, the first pulse generator 41 ceases delivery of the pulses Pu and now the second pulse generator 42 starts delivery of a train of logic "1" pulses Pw at the stage $S_6$ (FIG. 6). In the presence of a logic "1" pulse at the inverted output terminal $\overline{Q}$ of the first flip-flop circuit 56, the pulses Pw are passed through the second logic "AND" gate circuit 49 to the second monostable multivibrator 51, which is thus triggered to deliver to the third differentiator 53 a logic "1" pulse having a predetermined pulsewidth. When the retaining strap 24 is tightly fitted to the seat occupant, the reel shaft 23 is caused to cease rotation with the friction interlocking spring 35 sliding on the ratchet wheel 34 on the reel shaft 23, with the result that the second pulse generator 42 ceases delivery of the pulses Pw as at stage $S_7$ (FIG. 6). At a certain point of time after the delivery of the pulses Pw has thus been ceased, the logic "1" pulse on the output terminal of the second monostable multivibrator 51 disappears and as a consequence a logic "0" pulse appears at the output terminal of the monostable multivibrator 51, causing the differentiator 53 to produce a logic "1" pulse at its output terminal in response to the falling edge of the logic "1" pulse which is thus disappeared from the input terminal thereof. The logic "1" pulse produced by the second differentiator 53 is fed to one input terminal of the second logic "OR" gate circuit 59 and renders the "OR" gate circuit 59 into a state producing a logic "1" pulse at its output terminal. The logic "1" pulse thus appearing at the output terminal of the logic "OR" gate circuit 59 is fed to the reset terminal R of the second flip-flop circuit 60 and clears the flip-flop circuit 60 as will be seen from the waveforms Gr and Gq in FIG. 6 at stage $S_8$. A logic "0" pulse therefore appears at the non-inverted output terminal Q of the flip-flop circuit 60, thereby making the first relay switch 66 open and bringing the drive motor 28 to a stop. At the same time as the logic "0" pulse is produced at the non-inverted output terminal Q of the flip-flop circuit 60, a logic "1" pulse appears at the inverted output terminal $\overline{Q}$ of the flip-flop circuit 60 and is fed to one input terminal of the fourth logic "AND" gate circuit 55, which is thus rendered into a state producing a logic "1" pulse at its output terminal in the presence of the logic "1" pulse at the other input terminal thereof with the tongue-buckle switch 40 kept closed. The logic "1" pulse produced by the "AND" gate circuit 55 is fed to the set terminal S of the first flip-flop circuit 56, which is therefore caused to produce a logic "1" pulse at the non-inverted output terminal Q thereof. The logic "1" pulse appearing at the terminal Q of the flip-flop circuit 56 is fed to the fourth differentiator 57 and further to the trigger terminal T of the forward-backward pulse counter 43 and to one input terminal of each of the fifth to seventh logic "AND" gate circuits 63a, 63b and 63c. In response to the rising edge of the logic "1" pulse delivered from the non-inverted output terminal Q of the flip-flop circuit 56, the fourth differentiator 57 produces at its output terminal a logic "1" pulse, which is fed to the clear terminal C of the pulse counter 43 and clears the pulse counter 43 at the stage $S_8$.

The logic "1" pulse fed to the trigger terminal T of the pulse counter 43 from the flip-flop circuit 56 makes the pulse counter 43 operative to count the pulses Pw from the second pulse generator 42 and to produce an output signal Sn indicative of the number N of the pulses Pw counted. The signal Sn is fed to the comparator network 45 and is compared in each of the first, second and third comparators 45a, 45b and 45c with the reference signal Sr produced by the reference signal generator 44. Since, in this instance, the forward-backward pulse counter 43 is cleared at the stage $S_8$, viz., when the retaining strap 24 is tightly fitted to the seat occupant, the number N of the pulses Pw represented by the signal Sn is smaller than the number Nr of pulses represented by the reference signal Sn. It therefore follows that a logic "1" pulse is delivered from the first comparator 45a to one input terminal of the fifth logic "AND" gate circuit 63a, which is thus rendered into a state producing a logic "1" pulse at its output terminal in the presence of the logic "1" pulse at the other input terminal thereof as above described. The logic "1" pulse appearing at the output terminal of the "AND" gate circuit 63a is supplied to the set terminal S of the third flip-flop circuit 65 as will be seen from the waveform Hs and causes the second relay switch 67 to close and actuates the drive motor 28 to start. The drive motor 28 is now put into operation driving the output shaft 29 thereof in a direction to have the retaining strap 24 unwound from the reel shaft 23 (FIG. 6 at the stage $S_8$–$S_9$) and slackened from the condition tightly fitted to the seat occupant. The reel shaft 23 being driven for rotation in the direction to have the retaining strap 24 unwound from the reel shaft 23, the first pulse generator 41 is made operative to produce a train of first logic "1" pulses Pu. The pulses Pu are fed to and counted forwardly by the forward-backward pulse counter 43, which therefore starts to produce an information signal Sn which stepwise increases as the pulses Pu are supplied in succession thereto. When the number N of the information signal Sn produced by the pulse counter 43 is equalized with the number Nr of pulses represented by the reference signal Sr, a logic "1" pulse is produced from the output terminal of the second comparator 45b and is supplied to one input terminal of the sixth logic "AND" gate circuit 63b. A logic "1" pulse is therefore produced at the output terminal of the sixth logic "AND" gate circuit 63b in the presence of the logic "1" pulse at the other input terminal thereof and is fed to the reset terminal R of the third flip-flop circuit 65 as at stage $S_9$ as will be seen from the waveform Hr in FIG. 6. The third flip-flop circuit 65 is accordingly cleared as will be seen from the waveform Hq in FIG. 6 and makes the second relay switch 67 open, thereby causing the drive motor 28 to be de-energized. The drive motor 28 is now brought to a stop and the retaining strap 24 is fitted to the seat occupant with a certain degree of slackness which corresponds to the number Nr of pulses represented by the reference signal Sr produced by the reference signal generator 44. The logic "1" pulse produced by the "AND" gate circuit 63b is also fed through the second logic "OR" gate circuit 59 to the reset terminal R of the second flip-flop circuit 60 but brings no direct result since the flip-flop circuit 60 has already been cleared by the logic "1" pulse produced by the third differentiator 53 upon lapse of the duration of the logic "1" output pulse of the second monostable multivibrator 51 at the stage $S_8$. It may also be noted that the first flip-flop circuit 56 which has once triggered as above described can not be reset unless and until the tongue-buckle switch 40 is made open. Both of the first and second logic "AND" gate circuits 50 and 51 are therefore maintained in the states producing logic "0" pulses at the respective output terminals thereof by the logic "1" pulse present at the inverted output terminal $\overline{Q}$ of the flip-flop circuit 56. As long as the tongue member is detached from the buckle of the seat belt arrangement, the second and third flip-flop circuits 60 and 65 are for this reason maintained reset and accordingly the drive motor 28 is held inoperative even when a logic "1" pulse might appear at the output terminal of the second or third differentiator 52 or 53.

If the retaining strap 24 is thereafter pulled and unwound from the reel shaft 23 by the seat occupant who is forced or desires to stoop forwardly on the seat, the first pulse generator 41 starts to produce a train of pulses Pu as at stage $S_{10}$ (FIG. 6). These pulses Pu are fed to the first input terminal $I_1$ of the forward-backward pulse counter 43 so that the number N of the pulses counted by the counter 43 and represented by the signal Sn delivered therefrom increases beyond the number Nr of pulses represented by the reference signal Sr. A logic "1" pulse is therefore delivered from the third comparator 45c of the comparator network 45 to one input terminal of the seventh logic "AND" gate circuit 63c. In the presence of a logic "1" pulse at the set terminal S of the first flip-flop circuit 56 as will be seen from the waveform Fs in FIG. 6, the seventh logic "AND" gate circuit 63c is now rendered into a state producing a logic "1" pulse at its output terminal. The logic "1" pulse produced by the "AND" gate circuit 63c is fed to one input terminal of the first logic "OR" gate circuit 58 so that a logic "1"pulse is fed from the "OR" gate circuit 58 to the set terminal S of the second flip-flop circuit 60 at the stage $S_{10}$, causing the flip-flop circuit 60 to produce a logic "1" pulse at the non-inverted output terminal Q thereof as will be seen from the waveforms Gs and Gq in FIG. 6. The first relay switch 66 is therefore closed and as a consequence the drive motor 28 is actuated to drive its output shaft 29 in the direction to have the retaining strap 24 re-wound on the reel shaft 23 at stage $S_{10}$-$S_{11}$. The output shaft 29 of the motor 28 is thus driven for rotation in the opposite direction to the direction of rotation in which the reel shaft 23 is forced to rotate by the retaining strap 24 which is being unwound from the reel shaft 23. Under these conditions, the reel shaft 23 is rotated by the retaining strap 24 with the friction interlocking spring 35 sliding on the ratchet wheel 34.

When the seat occupant thereafter resumes the initial posture sitting on the seat upright, the retaining strap 24 is slackened and allows the reel shaft 23 to be driven for rotation from the drive motor 28 through the intermediary of the friction interlocking spring 35. The reel shaft 23 being thus driven for rotation in the direction to have the reel shaft 23 re-wound thereon, the first pulse generator 41 ceases delivery of the logic "1" pulses Pu and the second pulse generator 42 is made operative to produce a train of logic "1" pulses Pw as at stage $S_{11}$-$S_{12}$ (FIG. 6). These pulses Pw are fed to the second input terminal $I_2$ of the forward-backward pulse counter 43 and are counted backwardly or, in other words, the number of the pulses Pw is subtracted from the number of the pulses which have been registered in the pulse counter 43. The number N of the information signal Sn produced by the pulse counter 43 is for this reason reduced toward the number Nr of pulses represented by the reference signal Sr. When the number N of the pulses represented by the signal Sn is equalized with the number Nr of pulses represented by the reference signal Sr, a logic "1" pulse is produced from the output terminal of the second comparator 45b and is supplied to one input terminal of the sixth logic "AND" gate circuit 63b. A logic "1" pulse is therefore produced at the output terminal of the "AND" gate circuit 63b in the presence of the logic "1" pulse at the other input terminal thereof and is fed to the reset terminal R of the second flip-flop circuit 60 as at stage $S_{12}$ as will be seen from the waveform Gr in FIG. 6. The second flip-flop circuit 60 is accordingly cleared as will be seen from the waveform Gq in FIG. 6 and makes the first relay switch 66 open, thereby causing the drive motor 28 to be de-energized. The drive motor 28 is now brought to a stop and the retaining strap 24 is fitted to the seat occupant with a certain degree of slackness which corresponds to the number Nr of the reference signal Sr.

The number Nr of pulses or, in other words, the desired degree of slackness of the retaining strap 24 as represented by the reference signal Sr is determined by the slackness calculator 60 in such a manner as to decrease stepwise as the vehicle speed represented by the output signal from the vehicle speed sensor 61 increases as previously described. When the vehicle speed is increased or decreased and as a consequence the number Nr of the pulses represented by the reference signal Sr is respectively decreased or increased accordingly, the number N of the pulses registered in the pulse counter 43 will become larger or smaller than the number Nr which is indicative of a renewed desired degree of slackness. If, in this instance, the vehicle speed is increased and the number Nr of the pulses represented by the reference signal Sr is decreased accordingly, the number N of the pulses registered in the forward-backward pulse counter 43 will become larger than the number Nr, a logic "1" pulse appears at the output terminal of the third comparator 45c of the comparator network 45 and is fed through the first logic "OR" gate circuit 58 to the set terminal S of the second flip-flop circuit 60, making the first relay switch 66 closed and putting the drive motor 28 into operation to drive the reel shaft 23 in the direction to have the retaining strap 24 re-wound on the reel shaft 23 and tightened against the seat occupant as on phase $S_{13}$-$S_{14}$ (FIG. 6). The second flip-flop circuit 60 thus made operative is reset and accordingly the drive motor 28 is brought to a stop when the number N of the pulses registered in the pulse counter 43 is for a second time equalized with the reduced number Nr of pulses by the pulses Pw delivered from the second pulse generator 42 and backwardly counted by the pulse counter 43. If, on the contrary, the vehicle speed is decreased and as a consequence the number Nr of the pulses represented by the reference signal Sr is increased accordingly, the number N of the pulses registered in the pulse counter 43 will become smaller than the number Nr, a logic "1" pulse appears at the output terminal of the first comparator 45a of the comparator network 45 and is fed through the fifth logic "OR" gate circuit 63a to the set terminal S of the third flip-flop circuit 65, making the second relay switch 67 closed and putting the drive motor 28 into operation to drive the reel shaft 23 in the direction to have the retaining strap 24 unwound from the reel shaft 23 and slackened on the seat occupant as on phase $S_{15}$-$S_{16}$ (FIG. 6). The flip-flop circuit 65 thus made operative is reset and accordingly the drive motor 28 is brought to a stop also when the number N of the pulses registered in the pulse counter 43 is for a second time equalized with the increased number Nr of pulses by the pulses Pu delivered from the first pulse generator 41 and forwardly counted by the pulse counter 43.

The retaining strap 24 is in these manners tightened or slackened as the vehicle speed is increased or decreased, respectively, by varying the number Nr of pulses represented by the reference signal Sr. When, therefore, the vehicle is subjected to sudden deceleration with, for example, the brakes applied violently during cruising of the vehicle, the retaining strap 24 is withdrawn only a limited length before the emergency locking unit 25 (FIG. 3) is initiated into action and for this reason the seat belt arrangement is capable of protecting the seat occupant reliably.

When the tongue member of the seat belt arrangement is separated from the buckle, the tongue-buckle switch 40 is made open so that a logic "0" pulse appears at the input terminal of the first differentiator 47 as at stage $S_{17}$ (FIG. 6). In response to the falling edge of the logic "1" pulse which is thus disappeared from the input terminal of the first differentiator 47, a logic "1" pulse is produced at the output terminal of the differentiator 47 and is fed through the first logic "OR" gate circuit 58 to the set terminal S of the second flip-flop circuit 60, causing the flip-flop circuit 60 to produce a logic "1" pulse at the non-inverted output terminal thereof. The first relay switch 66 is caused to close by this logic "1" pulse and actuates the drive motor 28 to operate, driving the reel shaft 23 for rotation in the direction to have the retaining strap 24 re-wound on the reel shaft 23. The logic "1" pulse appearing at the output terminal of the first differentiator 47 is also fed to the reset terminal R of the first flip-flop circuit 56, which is now reset and produces a logic "0" pulse at the non-inverted output terminal Q thereof. The logic "0" pulse thus appearing at the output terminal Q of the flip-flop circuit 56 is supplied to the fourth differentiator 57 and the trigger terminal T of the forward-backward pulse counter 43. In response to the falling edge of the logic "1" pulse which is disappeared from the non-inverted output terminal Q of the flip-flop circuit 56, the differentiator 57 delivers a logic "1" pulse to the clear terminal C of the forward-backward pulse counter 43. The pulse counter 43 is accordingly cleared and rendered into the initial state thereof in the presence of the logic "0" pulse at the trigger terminal T and the logic "1" pulse at the clear terminal C thereof. The logic "1" pulse produced at the non-inverted output terminal Q of the flip-flop circuit 56 is further fed to one input terminal of each of the fifth, sixth and seventh logic "AND" gate circuits 63a, 63b and 63c, which are all rendered into states producing logic "0" pulses at their respective output terminals. It therefore follows that the first and second relay switches 66 and 67 and accordingly the second and third flip-flop circuits 60 and 65 are disconnected in effect from the comparator network 45. The drive motor 28 is in this fashion prevented from being brought to a stop or being put into operation driving the reel shaft 23 for rotation in the reverse direction by a logic "1" pulse which may be delivered from any of the comparators 45a, 45b and 45c of the comparator network 45 while the retaining strap 24 is being rewound on the reel shaft 23 after the tongue member has been detached from the buckle. When the first flip-flop circuit 56 is reset as above described, furthermore, a logic "1" pulse is delivered from the inverted output terminal Q̄ of the flip-flop circuit 56 to one input terminal of each of the first and second logic "AND" gate circuits 50 and 51. In the presence of the logic "1" pulses Pw at the other input terminal of the second logic "AND" gate circuit 49, a logic "1" pulse having a predetermined pulsewidth is present at the output terminal of the second monostable multivibrator 51 while the retaining strap 24 is being re-wound on the reel shaft 23. At a certain point of time after the retaining strap 24 has been completely re-wound on the reel shaft 23 as at stage $S_{18}$ (FIG. 6), the logic "1" pulse at the output terminal of the monostable multivibrator 51 lapses and causes the third differentiator 53 to produce a logic "1" pulse at its output terminal in response to the falling edge of the logic "1" pulse which is thus disappeared from input terminal of the differentiator 53. The logic "1" pulse appearing at the output terminal of the differentiator 53 is supplied through the second logic "OR" gate circuit 59 to the reset terminal R of the second flip-flop circuit 60 and clears the flip-flop circuit 60 as will be seen from the waveforms Gr and Gq in FIG. 6, causing the first relay switch 66 to open and bringing the drive motor 28 to a full stop.

As will be appreciated from the foregoing description, a strap retractor assembly according to the present invention has the following outstanding features over a prior-art retractor assembly of the previously described nature:

(1) The retaining strap 24 is unwound from and re-wound on the reel shaft 23 by the drive motor 28 operated under the control of the electric signal processing network 46. Since a spring is not used for the re-winding of the retaining strap 24 on the reel shaft 23, the retractor assembly can be constructed compactly and manufactured economically. While the force to have the strap withdrawn from the reel shaft increases as the strap is unwound from the reel shaft in a prior-art retractor assembly, such a force is maintained substantially constant without regard to the length to which the retaining strap 24 is unwound from the reel shaft 23 in a strap retractor assembly according to the present invention.

(2) The retaining strap 24 is slackened to a certain degree after the strap 24 has once been tightly fitted to the seat occupant. The retaining strap 24 can not therefore be slackened excessively in contrast to the retaining strap of a prior-art retractor assembly in which the degree of slackness is determined through detection of the position of the buckle to which the tongue member is fitted.

(3) The degree of slackness is adjusted depending upon vehicle speed so that the seat belt arrangement is capable of protecting a seat occupant reliably at any speed of the vehicle.

What is claimed is:

1. A strap retractor assembly for use in a vehicular seat belt arrangement including an elongated flexible retaining strap to be fitted to an occupant of a seat structure in a vehicle body, comprising
   a reel shaft rotatable about an axis fixed with respect to the vehicle body and having said retaining strap anchored thereto at one end of the strap;
   a drive motor operable for driving the reel shaft for rotation about said axis in a direction to have the retaining strap unwound from the reel shaft and in a direction to have the retaining strap re-wound on the reel shaft;
   a combination of gears mechanically intervening between the reel shaft and the drive motor for transmitting a driving power from the drive motor to the reel shaft;
   pulse generating means operative to produce first pulses in response to rotation of the reel shaft in one direction about said axis and second pulses in response to rotation of the reel shaft in the other direction about said axis;
   resettable pulse counting means operative to count said first pulses forwardly and said second pulses backwardly and to produce an information signal representative of the number of the pulses counted;
   reference signal generating means responsive to a variable parameter and operative to produce a reference signal which is variable with said parameter and which is representative of a number of pulses corresponding to a desired degree of slackness of the retaining strap;
   comparing means operative to compare the number of the pulses represented by said information signal with the number of pulses represented by said reference signal and to produce a signal when the number of the pulses represented by the information signal is in a predetermined relationship to the number of pulses represented by the reference signal; and
   a signal processing network operative to process the signals and pulses delivered from said pulse generating means and comparing means and to produce, on the basis of the output signal from the comparing means, a control signal to actuate said drive motor into operation driving the reel shaft in either direction about the center axis thereof.

2. A strap retractor assembly as set forth in claim 1, in which said reference signal generating means comprises a vehicle speed sensor operative to detect vehicle speed as said variable parameter and to produce an output signal representative of the detected vehicle speed, and a slackness calculator responsive to the output signal from the vehicle speed sensor and operative to produce said reference signal on the basis of the output signal from the vehicle speed sensor.

3. A strap retractor assembly as set forth in claim 2, in which said slackness calculator is operative to produce said reference signal in such a manner that the number of pulses represented by the reference signal increases and decreases as the detected vehicle speed represented by the output signal from said vehicle speed sensor decreases and increases, respectively.

4. A strap retractor assembly as set forth in claim 2 or 3, further comprising signal generating switch means responsive to a predetermined condition in which said retaining strap is ready to be fitted to the occupant of the seat structure and operative to produce a signal in response to the predetermined condition.

5. A strap retractor assembly as set forth in claim 4, in which said comparing means comprises at least three comparators which consist of first, second and third comparators, each of which is operative to compare the information signal from said pulse counting means with the reference signal from the reference signal generator and to produce said output signal from the first comparator when the former is lower than the latter, from the second comparator when the former is equal to the latter, and from the third comparator when the former is higher than the latter.

6. A strap retractor assembly as set forth in claim 5, in which said signal processing network comprises a first differentiator having an input terminal connected to the signal generating switch means and operative to detect rising and falling voltages of the output signal from the switch means and to produce an output signal in response to a rise or a fall of the voltage at the input terminal thereof; a first logic "AND" gate circuit responsive to said first pulses; a second logic "AND" gate circuit responsive to said second pulses; a first monostable multivibrator having an input terminal connected to an output terminal of the first logic "AND" gate circuit; a second monostable multivibrator having an input terminal connected to an output terminal of the second logic "AND" gate circuit; a second differentiator which has an input terminal connected to an output terminal of the first monostable multivibrator and which is operative to detect the falling edges of a signal to appear at the output terminal of the first monostable multivibrator; a third differentiator which has an input terminal connected to an output terminal of the second monostable multivibrator and which is operative to detect the falling edges of a signal to appear at the output terminal of the second monostable multivibrator; a third logic "AND" gate circuit having an input terminal connected to an output terminal of the second differentiator; a fourth logic "AND" gate circuit having an input terminal connected to said signal generating switch means; a first flip-flop circuit having a set terminal connected to an output terminal of the fourth logic "AND" gate circuit, a reset terminal connected to an output terminal of the first differentiator, a non-inverted output terminal and an inverted output terminal connected to another input terminal of each of the first and second logic "AND" gate circuits; a fourth differentiator having an input terminal connected to the non-inverted output terminal of the first flip-flop circuit and responsive to the rising and falling edges of a signal to appear at the input terminal thereof; a first logic "OR" gate circuit having an input terminal connected to an output terminal of said first differentiator and an input terminal connected to an output terminal of said third logic "AND" gate circuit; a second logic "OR" gate circuit having an input terminal connected to an output terminal of said third differentiator; a second flip-flop circuit having a set terminal connected to an output terminal of said first logic "OR" gate circuit, a reset terminal connected to an output terminal of said second logic "OR" gate circuit, a non-inverted output terminal, and an inverted output terminal connected to another input terminal of said fourth logic "AND" gate circuit; said pulse counting means having first and second input terminals connected to said pulse generating means, a trigger terminal connected to the non-inverted output terminal of said first flip-flop circuit and a clear terminal connected to an output terminal of said fourth differentiator; fifth, sixth and seventh logic "AND" gate circuits having respective input terminals connected jointly to the non-inverted output terminal of said first flip-flop circuit and respectively to the output terminals of said comparators, and a third flip-flop circuit having a set terminal, a reset terminal, and a non-inverted output terminal; the fifth logic "AND" gate circuit having an output terminal connected via a logic inverter to another input terminal of said third logic "AND" gate circuit, the sixth logic "AND" gate circuit having an output terminal connected to the reset terminal of the third flip-flop circuit and to another input terminal of said second logic "OR" gate circuit, the seventh logic "AND" gate circuit having an output terminal connected to another input terminal of said first logic "OR" gate circuit, the second and third flip-flop circuits having their respective non-inverted output terminals connected to first and second switch means connected in parallel across said drive motor.

* * * * *